| | | |
|---|---|---|
| (12) | United States Patent<br>Horning et al. | (10) Patent No.: US 10,428,942 B2<br>(45) Date of Patent: Oct. 1, 2019 |

(54) FLUTED PISTON COMPONENTS FOR PUMPS

(71) Applicant: Graco Minnesota Inc., Minneapolis, MN (US)

(72) Inventors: Jeromy D. Horning, Albertville, MN (US); Christopher A. Lins, Waverly, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 288 days.

(21) Appl. No.: 15/395,139

(22) Filed: Dec. 30, 2016

(65) Prior Publication Data

US 2017/0191478 A1    Jul. 6, 2017

Related U.S. Application Data

(60) Provisional application No. 62/272,771, filed on Dec. 30, 2015, provisional application No. 62/272,779, filed on Dec. 30, 2015.

(51) Int. Cl.
*F16J 1/09*    (2006.01)
*F04B 19/22*   (2006.01)
(Continued)

(52) U.S. Cl.
CPC .............. *F16J 1/09* (2013.01); *F04B 1/0408* (2013.01); *F04B 7/06* (2013.01); *F04B 13/00* (2013.01); *F04B 15/00* (2013.01); *F04B 17/03* (2013.01); *F04B 17/06* (2013.01); *F04B 19/003* (2013.01); *F04B 19/22* (2013.01); *F04B 53/126* (2013.01);
(Continued)

(58) Field of Classification Search
CPC .... F04B 19/003; F04B 1/0408; F04B 53/144; F04B 53/147; F04B 53/14; E21B 43/121; F16J 1/09
See application file for complete search history.

(56) References Cited

U.S. PATENT DOCUMENTS 1,649,971 A    11/1927   Neilsen
2,394,371 A    2/1946    Davis et al.
(Continued)

FOREIGN PATENT DOCUMENTS

CN    201215081 Y    4/2009
CN    102052295 A    5/2011
(Continued)

OTHER PUBLICATIONS

Chinese Office for CN Application No. 2016112639388, dated Jun. 25, 2018, 11 pages.
(Continued)

*Primary Examiner* — Abiy Teka
(74) *Attorney, Agent, or Firm* — Kinney & Lange, P.A.

(57) ABSTRACT

A piston rod and piston head are the driven components within a pump. An upstream end of the piston rod is attached within an aperture of the piston head. At least one flute extends between the upstream end of the piston rod and the aperture, and the at least one flute is configured to provide a flowpath for a fluid, such as paint, to flow downstream of the piston head and piston rod. The flutes facilitate a smooth downstream flow of the fluid, thereby reducing hydraulic resistance and reducing wear caused by the fluid.

23 Claims, 9 Drawing Sheets

(51) Int. Cl.

| | | |
|---|---|---|
| *F04B 53/14* | (2006.01) | |
| *F04B 53/18* | (2006.01) | |
| *F04B 7/06* | (2006.01) | |
| *F04B 13/00* | (2006.01) | |
| *F04B 15/00* | (2006.01) | |
| *F04B 17/03* | (2006.01) | |
| *F04B 17/06* | (2006.01) | |
| *F04B 53/12* | (2006.01) | |
| *F04B 1/04* | (2006.01) | |
| *F04B 19/00* | (2006.01) | |

(52) U.S. Cl.
CPC ............ *F04B 53/14* (2013.01); *F04B 53/144* (2013.01); *F04B 53/147* (2013.01); *F04B 53/148* (2013.01); *F04B 53/18* (2013.01)

(56) References Cited

U.S. PATENT DOCUMENTS

| | | |
|---|---|---|
| 3,057,300 A | 10/1962 | Ulbing |
| 3,106,138 A | 10/1963 | Thoma |
| 3,170,298 A | 2/1965 | Shellhause |
| 3,172,338 A | 3/1965 | Ackerman |
| 3,279,376 A | 10/1966 | Hart |
| 3,351,316 A | 11/1967 | Lewis et al. |
| 3,489,093 A | 1/1970 | Thomber |
| 4,089,229 A | 5/1978 | Geraci |
| 4,180,028 A | 12/1979 | Richter |
| 4,479,759 A | 10/1984 | Zeitz |
| 4,785,997 A | 11/1988 | Liska et al. |
| 4,804,109 A | 2/1989 | Vanderjagt |
| 5,211,611 A | 5/1993 | Lammers et al. |
| 5,435,697 A | 7/1995 | Guebeli et al. |
| 5,660,534 A | 8/1997 | Snow |
| 5,740,718 A | 4/1998 | Rathweg |
| 6,015,010 A | 1/2000 | Kostrov |
| 6,212,999 B1 | 4/2001 | Thompson |
| 6,244,226 B1 | 6/2001 | Berlinger et al. |
| 6,283,148 B1 | 9/2001 | Spears et al. |
| 6,599,107 B2 | 7/2003 | Cooper et al. |
| 6,702,067 B2 | 3/2004 | Iversen et al. |
| 7,383,878 B1* | 6/2008 | Victor .................. E21B 43/121 166/105 |
| 8,272,858 B2 | 9/2012 | Bollwek et al. |
| 8,360,756 B2 | 1/2013 | Ford |
| 9,032,862 B2 | 5/2015 | Yong et al. |
| 2008/0217565 A1 | 9/2008 | Ford |
| 2014/0231537 A1 | 8/2014 | Hukriede et al. |

FOREIGN PATENT DOCUMENTS

| | | |
|---|---|---|
| CN | 202228091 U | 5/2012 |
| CN | 103161725 A | 6/2013 |
| DE | 10 2009 046351 A1 | 5/2011 |

OTHER PUBLICATIONS

Extended European Search Report for EP Application No. 16207460.3, dated Aug. 7, 2017, 9 pages.

* cited by examiner

FLUTED PISTON COMPONENTS FOR PUMPS

CROSS-REFERENCE TO RELATED APPLICATION(S)

This application claims priority to U.S. Provisional Application No. 62/272,771 filed Dec. 30, 2015, and entitled "FLUTED PISTON ROD COMPONENTS," and to U.S. Provisional Application No. 62/272,779 filed Dec. 30, 2015, and entitled "ROTATING PISTON ROD FOR PUMPS," the disclosures of which are hereby incorporated in their entirety.

BACKGROUND

The present disclosure relates generally to fluid dispensing systems. More specifically, this disclosure relates to displacement pumps for fluid dispensing systems.

Fluid dispensing systems, such as fluid dispensing systems for paint and other solutions, typically utilize axial displacement pumps to pull a fluid from a source and to drive the fluid downstream. The axial displacement pump includes a piston that is driven in a reciprocatory manner along its longitudinal axis to pump the fluid. As the piston reciprocates, fluid is drawn into the piston, flows through a central bore aligned with the longitudinal axis, and flows out of the piston through a second bore, and optionally a third bore, oriented orthogonal to the longitudinal axis. The second bore and optional third bore turn the fluid at a right angle to the longitudinal axis, such that the fluid exits the piston orthogonal to the longitudinal axis. Flowing the fluid through the piston and turning the fluid out of the cross-bore increases hydraulic resistance, induces turbulence in the fluid, and reduces the flow rate of the fluid; in addition, the flow area through the piston is limited by the diameter of the piston and the cross-bore, and the limited flow area also causes increased hydraulic resistance and induces turbulent flow.

SUMMARY

According to one aspect, a pump includes a cylinder having an upstream end and a downstream end and a piston at least partially disposed within the cylinder and including a longitudinal axis. The piston includes a piston head, a piston rod, and a flute. The piston head is disposed within the cylinder and divides a fluid chamber of the cylinder into an upstream chamber and a downstream chamber. The piston head has an aperture extending therethrough. The piston rod extends into the cylinder and is connected to the piston head, the piston rod includes a first end extending out of the upstream end of the cylinder and a second end at least partially extending into the aperture of the piston head and attached to the piston head. The flute is disposed between the second end and the piston head, and the flute is configured to provide a flowpath for fluid to flow from the upstream chamber to the downstream chamber through the piston.

According to another aspect, piston for a fluid pump includes a piston head, a piston rod, and a flute. The piston head includes an aperture extending therethrough. The piston rod is attached to the piston head and at least partially extends into the aperture. The flute is disposed between an exterior surface of the piston rod and an interior surface of the aperture, and the flute is configured to provide a flowpath through the piston head.

According to yet another aspect, a method of manufacturing a piston includes fabricating a piston rod having an upstream end, fabricating a piston head having an aperture extending therethrough, wherein the aperture is configured to receive the upstream end, and forming a flute on one of an exterior surface of the upstream end and an interior surface of the aperture, wherein the flute is configured to provide a fluid flowpath between the exterior surface of the upstream end and the interior surface of the aperture.

According to yet another aspect, a piston rod for pumping fluid includes a piston rod body elongated along a longitudinal axis. The piston rod body includes one or more flutes, each of the one or more flutes respectively comprising an open groove that extends along an exterior of the piston rod body, wherein fluid flows within the one or more flutes during pumping.

According to yet another aspect, a piston for pumping fluid by reciprocating along a longitudinal axis includes a piston rod, a piston head, and at least two flutes. The piston rod is elongated to have a downstream end and an upstream end. The piston head has a head upstream face, an upstream bore open on the head upstream face, and a downstream aperture in fluid communication with the upstream bore. The upstream end of the piston rod extends into the downstream aperture of the piston head, the piston head is larger in diameter than the piston rod, and the piston rod and the piston head are coaxial with the longitudinal axis. The at least two flutes are in fluid communication with the upstream bore and the fluid being pumped flows along the at least two flutes. The at least two flutes are formed one or along the downstream aperture of the piston head and along the upstream end of the piston rod.

According to yet another aspect, a pump for pumping fluid includes a piston and a cylinder within which the piston is at least partially disposed. The piston includes a piston rod and a piston head. The piston rod is elongated to have a downstream end and an upstream end and includes two or more flutes extending along, and arrayed around, an exterior of the downstream end of the piston rod, with each of the flutes comprising a groove formed into the exterior of the downstream end. The piston head has a downstream aperture, and the upstream end of the piston rod extends into the downstream aperture of the piston head. The piston is configured to reciprocate within the cylinder to pump fluid, and all of the fluid being pumped must flow within at least one of the two or more flutes.

DETAILED DESCRIPTION

Pumps according to the present disclosure reciprocate a piston within a cylinder to pump various fluids, examples of which include paint, water, oil, stains, finishes, aggregate, coatings, and solvents, amongst other options. A piston pump can generate high fluid pumping pressures, such as 3,000-5,000 pounds per square inch or even higher. High fluid pumping pressure is useful for atomizing the fluid into a spray for applying the fluid to a surface. The generation of high fluid pumping pressure can cause accelerated wear in the components of the pump which reciprocate relative to one another. Aspects of the present disclosure can reduce or minimize the effects of wear in a piston pump, as further discussed herein.

Figure 1A:
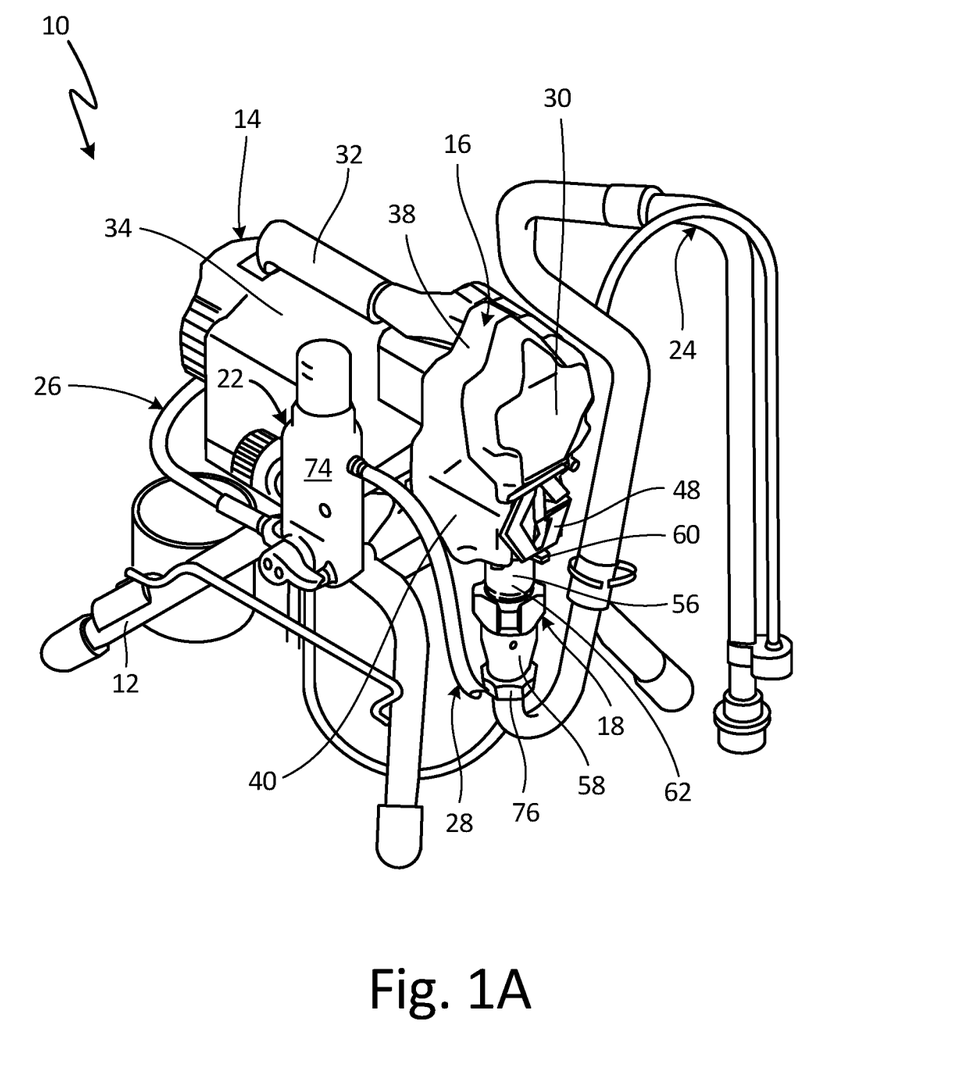
FIG. 1A is an isometric view of a fluid dispensing system.
Figure 1B:
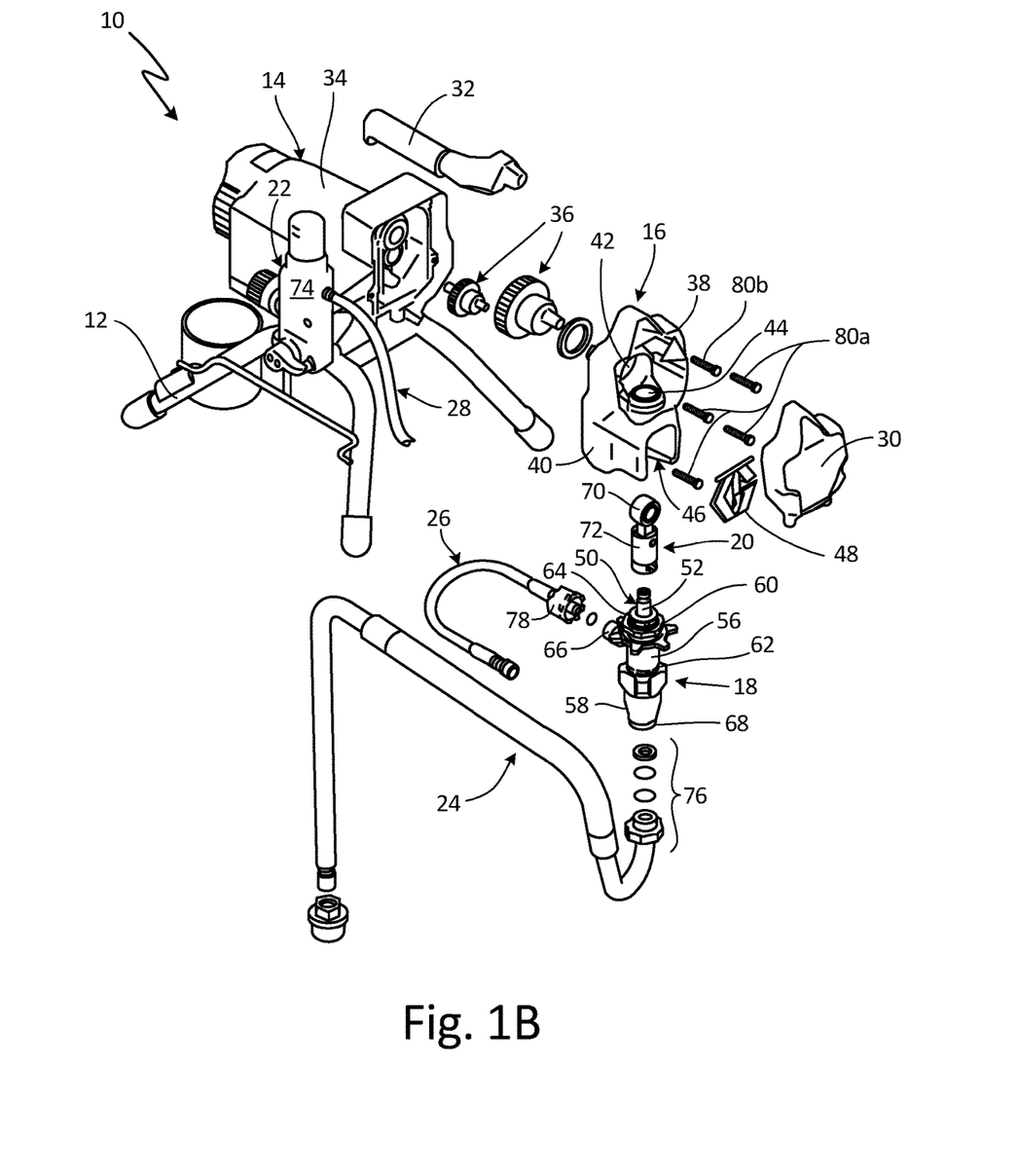
FIG. 1B is an exploded view of the fluid dispensing system of FIG. 1A.

FIG. 1A is an isometric view of fluid dispensing system 10. FIG. 1B is an exploded view of fluid dispensing system 10. FIGS. 1A and 1B will be discussed together. Fluid dispensing system 10 includes frame 12, motor section 14, drive housing 16, displacement pump 18, reciprocating drive 20, control system 22, intake hose 24, supply hose 26, dispensing hose 28, housing cover 30, and handle 32. Motor section 14 includes motor housing 34 and drive gears 36. Drive housing 16 includes upper portion 38 and lower portion 40. Upper portion 38 includes gear aperture 42 and link aperture 44. Lower portion 40 includes mounting cavity 46 and guard 48. Displacement pump 18 includes piston 50 (which includes piston rod 52 and piston head 54 (shown in FIGS. 2B-3B)), cylinder 56, intake housing 58, and clamp 60. Cylinder 56 includes upstream end 62, downstream end 64, and outlet port 66. Intake housing 58 includes inlet port 68. Reciprocating drive 20 includes connecting rod 70 and drive link 72. Control system 22 includes control housing 74. Intake hose 24 includes intake fitting 76, and supply hose 26 includes supply fitting 78.

Frame 12 supports motor section 14, and drive housing 16 is mounted to motor section 14. Fasteners 80a extend through drive housing 16 and into motor section 14 to secure drive housing 16 to motor section 14. Handle 32 is attached to drive housing 16 by fastener 80b, which extends through drive housing 16 and into handle 32. Housing cover 30 is attached to and encloses upper portion 38 of drive housing 16. Drive gears 36 are disposed within motor section 14 and extend into upper portion 38 of drive housing 16 through gear aperture 42. Drive gears 36 are driven by a motor (not shown) disposed within motor housing 34. Any desired motor can be utilized to power drive gears 36. For example, fluid dispensing system 10 can be electric, pneumatic, or hydraulic powered.

Upper portion 38 of drive housing 16 is integral with lower portion 40 of drive housing 16. Gear aperture 42 extends through a rearward side of upper portion 38, and link aperture 44 extends through drive housing 16 between upper portion 38 and lower portion 40. Mounting cavity 46 extends into lower portion 40 and is configured to receive displacement pump 18. Guard 48 is mounted on lower portion 40 and is configured to cover mounting cavity 46.

Reciprocating drive 20 is disposed within drive housing 16. Drive link 72 is attached to connecting rod 70. Connecting rod 70 is disposed within upper portion 38 of drive housing, and drive link 72 extends through link aperture 44 and into mounting cavity 46. Connecting rod 70 is attached to and driven by drive gears 36 extending into upper portion 38 through gear aperture 42. Connecting rod 70 translates the rotational movement of drive gears 36 into linear movement of drive link 72.

Displacement pump 18 is at least partially disposed within mounting cavity 46 and can be secured by clamp 60. Clamp 60 extends about cylinder 56, and clamp 60 secures displacement pump 18 to lower portion 40 of drive housing 16. While displacement pump 18 is described as being secured to drive housing 16 by clamp 60 disposed on cylinder 56, it is understood that displacement pump 18 can be mounted in any suitable manner. For example, displacement pump 18 can include external threads configured to mate with threading on drive housing 16, or displacement pump 18 can be secured by a clamping mechanism integral with drive housing 16.

Intake housing 58 is attached to upstream end 62 cylinder 56 to form a body of displacement pump 18. Piston 50 is at least partially disposed within displacement pump 18. Piston rod 52 extends into cylinder 56 through downstream end 64 of cylinder 56 and is connected to piston head 54, which is disposed within displacement pump 18. An end of piston rod 52 extending out of cylinder 56 is connected to drive link 72, and drive link 72 is configured to drive piston rod 52 in a reciprocating manner. Piston rod 52 can be connected to drive link 72 in any suitable manner; for example, piston rod 52 can include a head mounted in a slot in drive link 72, or piston rod 52 can be pinned to drive link 72.

Intake hose 24 extends between a fluid source and displacement pump 18. Intake fitting 76 is connected to inlet port 68 to provide the fluid to intake housing 58. Any suitable fitting can be utilized to connect intake hose 24 to inlet port 68. Supply hose 26 extends between outlet port 66 of cylinder 56 and control housing 74, to provide the fluid from displacement pump 18 to control housing 74. Supply fitting 78 is connected to outlet port 66 to attached supply hose 26 to displacement pump 18. Any suitable fitting can be utilized to connect supply hose 26 to outlet port 66. Dispensing hose 28 is connected to control housing 74 and extends between control housing 74 and a dispenser (not shown), such as a spray gun. Control system 22 includes various components, such as a pressure regulator and a priming valve, utilized to set a flow rate and flow pressure, among other operational criteria, of the fluid. Dispensing hose 28 provides the fluid downstream of fluid dispensing system 10.

During operation, the motor of the motor section 14 drives drive gears 36 in a rotational manner, and connecting rod 70 follows drive gears 36 due to the connection of drive gears 36 and connecting rod 70. Connecting rod 70 translates the rotational movement of drive gears 36 into linear movement of drive link 72, such that drive link 72 reciprocates through link aperture 44. Drive link 72 thereby drives piston 50 in a reciprocating manner, due to the connection of piston rod 52 and drive link 72. Driving piston 50 in a reciprocating manner causes piston 50 to draw the fluid into displacement pump 18 through intake hose 24 and intake housing 58, and to pump the fluid downstream through cylinder 56 and supply hose 26.

The fluid is drawn from an external source (e.g., a bucket) through intake hose 24 and enters displacement pump 18 through inlet port 68. The fluid is driven through displacement pump 18 by piston 50, and the fluid exits displacement pump 18 through outlet port 66 in cylinder 56. The fluid flows into supply hose 26 from outlet port 66 and flows to control housing 74. The fluid exits control housing 74 through dispensing hose 28 and flows downstream to the dispenser, where the fluid can be dispensed for any desired purpose, such as applying paint to a surface with a spray gun. Displacement pump 18 thus draws the fluid from a container through intake hose 24, drives the fluid downstream to control system 22 through supply hose 26, and drives the fluid through dispensing hose 28 and to a dispenser where the fluid is applied in any desired manner.

Figure 2A:
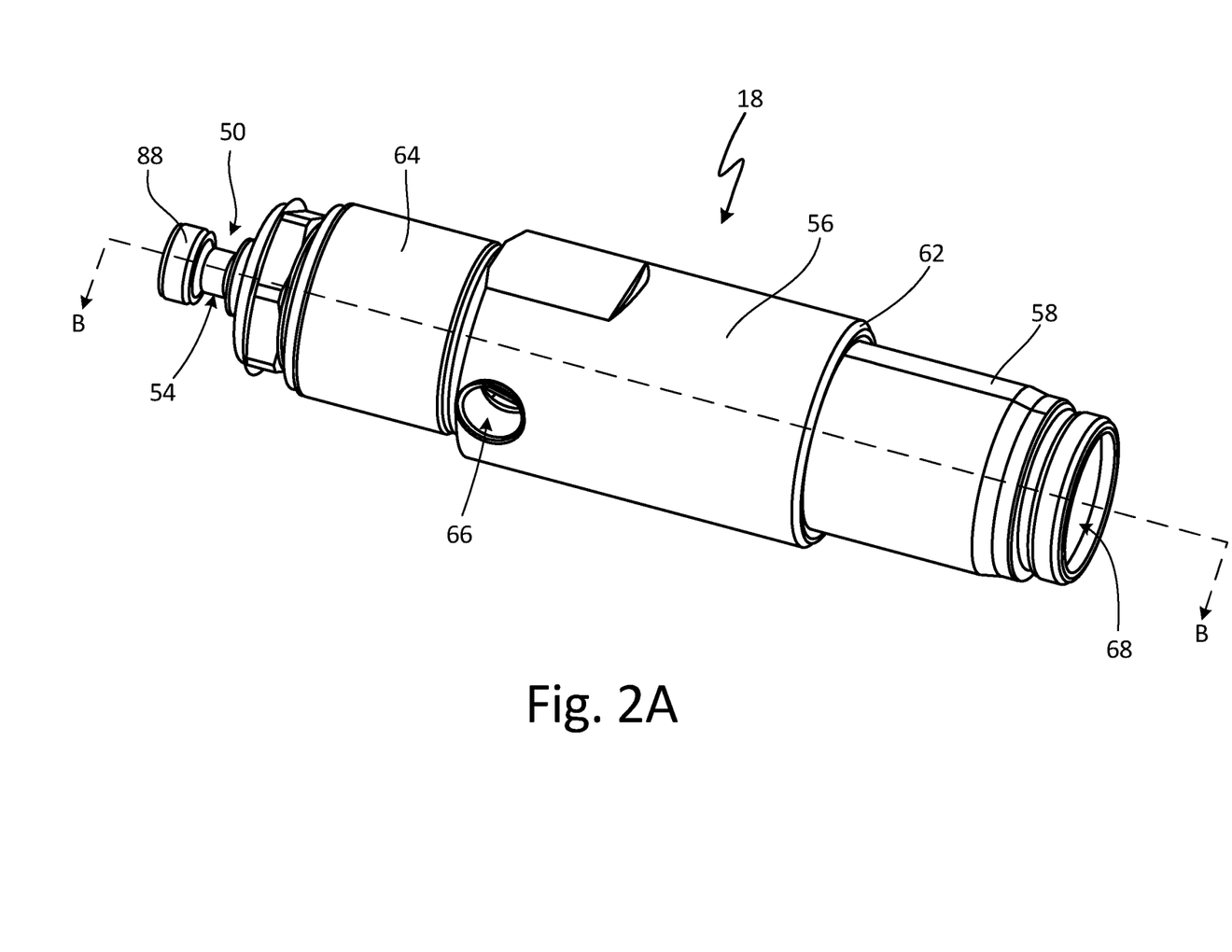
FIG. 2A is an isometric view of a fluid pump.
Figure 2B:
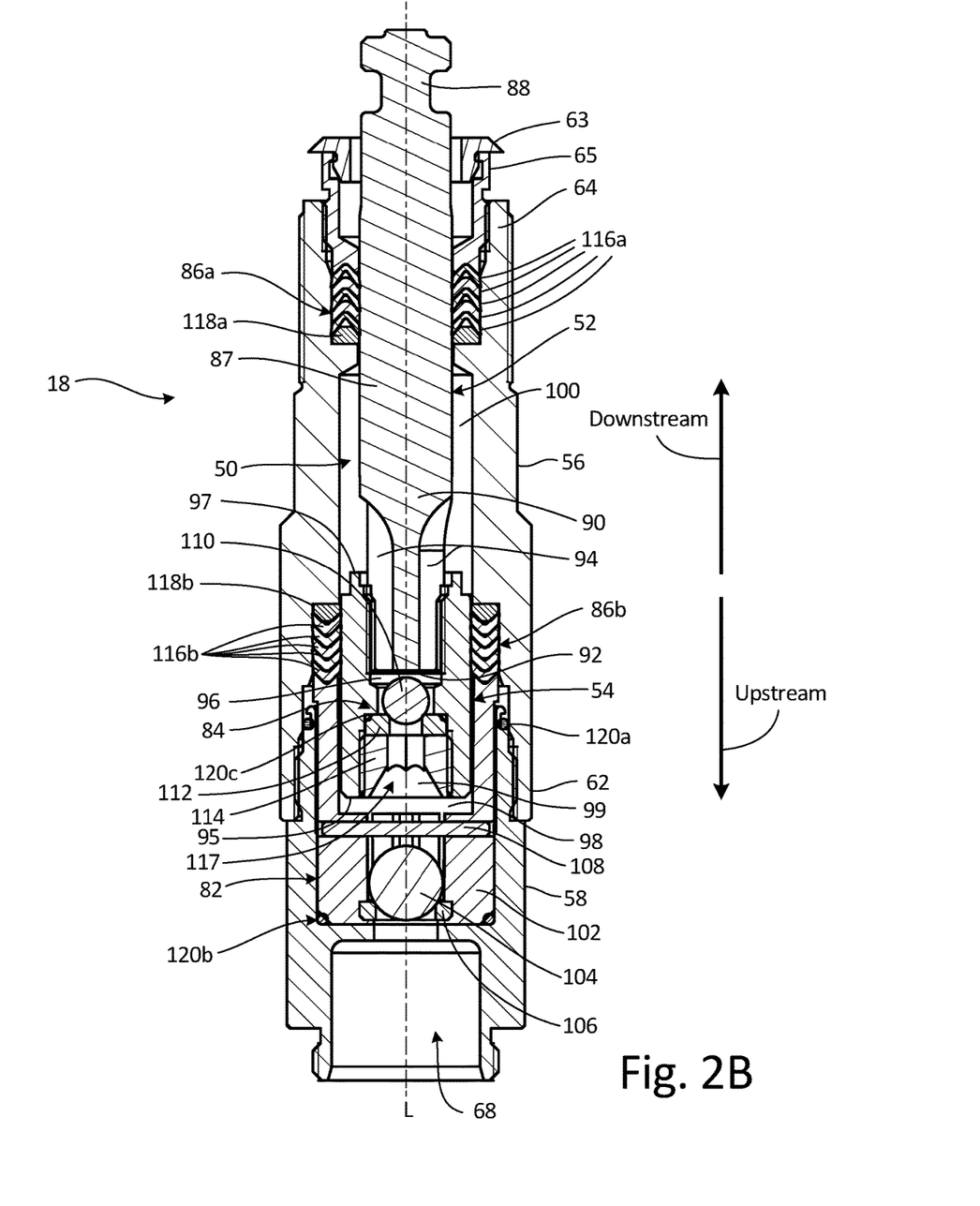
FIG. 2B is a cross-sectional view of the fluid pump of FIG. 2A taken along line B-B of FIG. 2A.

FIG. 2A is an isometric view of displacement pump 18. FIG. 2B is a cross-sectional view of displacement pump 18 taken along line B-B in FIG. 2A. FIGS. 2A and 2B will be discussed together. Displacement pump 18 includes piston 50, cylinder 56, intake housing 58, first check valve 82, second check valve 84, and pressurizing seals 86a and 86b. Piston 50 includes piston rod 52 and piston head 54. Piston rod 52 includes piston rod body 87, first end 88, and second end 90, and second end 90 includes upstream face 92 and flutes 94. Piston head 54 includes upstream face 95, downstream face 97, and central bore 117 which extends through piston head 54. Piston head 54 further includes downstream aperture 96 and upstream bore 99, which, in the embodiment shown, form a downstream portion and an upstream portion of central bore 117, respectively. Cylinder 56 includes upstream end 62, downstream end 64, outlet port 66 (shown in FIG. 2A), first fluid chamber 98, and second fluid chamber 100. Intake housing 58 includes inlet port 68. First check valve 82 includes ball cage 102, first ball 104, first seat 106, and pin 108. Second check valve 84 includes second ball 110, second seat 112, and retainer 114. Pressurizing seal 86a includes packing rings 116a and seal gland 118a, and pressurizing seal 86b includes packing rings 116b and seal gland 118b. A generally downstream direction is indicated by downstream arrow, and a generally upstream direction is indicated by upstream arrow.

Intake housing 58 is mounted to upstream end 62 of cylinder 56. Seal 120a, which is disposed between intake housing 58 and cylinder 56, helps to prevent fluid from leaking from between intake housing 58 and cylinder 56.

Piston 50 is at least partially disposed within cylinder 56. Piston 50 extends along longitudinal axis L-L, with longitudinal axis L-L oriented coaxial with the generally elongate profile of displacement pump 18. It is understood that longitudinal axis L-L can be oriented coaxially with cylinder 56, intake housing 58, and various other components of displacement pump 18.

Piston rod 52 extends into cylinder 56 through downstream end 64 of cylinder 56. Piston rod 52 extends through cap 63 and packing nut 65. Piston rod body 87 is elongated along longitudinal axis L-L between first end 88 and second end 90. First end 88 of piston rod 52 projects of out cylinder 56 and is configured to connect to a driving mechanism, such as reciprocating drive 20 (shown in FIG. 1B). First end 88 can be attached to the driving mechanism in any suitable manner; for example, first end 88 can be inserted into a slot in the driving mechanism or can be pinned to the driving mechanism. Second end 90 of piston rod 52 is at least partially disposed within downstream aperture 96 of piston head 54. A diameter of piston head 54 is larger than a diameter of piston rod 52, and second end 90 is secured within downstream aperture 96, thereby attaching piston rod 52 to piston head 54. Second end 90 can be secured within downstream aperture 96 in any suitable manner. For example, piston rod 52 and piston head 54 can be separately formed and later attached, such as by exterior threading disposed on second end 90 mating with interior threading disposed within downstream aperture 96, by gluing, by welding, or by any other suitable method. Piston rod 52 and piston head 54 can also be integrally formed, such that piston 50 is of a single-piece construction.

Flutes 94 are disposed between an exterior of piston rod 52 and an interior of piston head 54, and flutes extend along piston rod 52 and into second fluid chamber 100. Flutes 94 are open grooves extending along an exterior of piston rod body 87. Flutes 94 are open on upstream face 92 such that flutes 94 can receive fluid passing through upstream face 92.

Piston head 54 is disposed within cylinder 56 and divides cylinder 56 into first fluid chamber 98 and second fluid chamber 100.

First check valve 82 is mounted in intake housing 58. Ball cage 102 is disposed within intake housing 58, and first ball 104 is disposed within ball cage 102. First seat 106 is disposed between ball cage 102 and inlet port 68 of intake housing 58. Pin 108 extends through ball cage 102 and is disposed on a downstream side of first ball 104. Seal 120b is disposed between intake housing 58 and ball cage 102 to prevent leakage of fluid between intake housing 58 and ball cage 102.

Second check valve 84 is disposed within central bore 117 of piston head 54, and in the embodiment illustrated is disposed within upstream bore 99. Second seat 112 is disposed within upstream bore 99, and retainer 114 engages an interior surface of upstream bore 99, such as with threading, to secure second seat 112 within upstream bore 99. Second ball 110 is disposed within upstream bore 99 between second seat 112 and upstream face 92 of piston rod 52. Second seat 112 and retainer 114 are fixed relative to piston head 54. Second ball 110 is movable between a closed position, where second ball 110 abuts second seat 112, and an open position, where second ball 110 abuts upstream face 92. Seal 120c is disposed between second seat 112 and piston head 54 to prevent leakage of fluid through piston head 54.

Pressurizing seal 86a is disposed between cylinder 56 and first end 88 of piston rod 52. Cap 63 and packing nut 65 are attached to downstream end 64 of cylinder 56 and retain pressurizing seal 86a within cylinder 56. Pressurizing seal 86a remains stationary with respect to cylinder 56 as piston rod 52 moves relative to cylinder 56 during operation. Packing rings 116a surround and tightly interface with first end 88 of piston rod 52 to create a seal about first end 88. The seal about first end 88 prevents the fluid from leaking out of downstream end 64 of cylinder 56 about piston rod 52. Pressurizing seal 86b is disposed between piston head 54 and cylinder 56. Similar to pressurizing seal 86a, pressurizing seal 86b remains stationary with respect to cylinder 56 as piston head 54 moves relative to cylinder 56 during operation. Packing rings 116b surround and tightly interface with piston head 54 to create a seal. The seals created between pressurizing seal 86a and first end 88, and pressurizing seal 86b and piston head 54 facilitate a vacuum condition in cylinder 56 that draws the fluid into and dispels the fluid from cylinder 56. While pressurizing seal 86a and pressurizing seal 86b are described as remaining stationary relative to cylinder 56 as piston 50 reciprocates within cylinder 56, it is understood that pressurizing seal 86a and/or pressurizing seal 86b can be mounted to piston 50 such that the pressurizing seal 86a and/or pressurizing seal 86b moves with piston 50 relative to cylinder 56. It is noted in summary that the piston (including the piston head and piston rod) and/or the packing rings 132 linearly translates in a reciprocating manner relative to the cylinder 56 and/or the packing rings 132 to pump fluid.

Seal gland 118a retains packing rings 116a, and seal gland 118b retains packing rings 116b. While a single seal gland 118 is illustrated for each stack of packings rings 116a and 116b, it is understood that a pair of seal glands 118, such as a first seal gland disposed on the upstream side and a second seal gland disposed the downstream side of a stack of packing rings, can be utilized to retain packing rings 116a and 116b. While displacement pump 18 is illustrated as including two pressurizing seals 86, it is understood that displacement pump 18 can include any number of pressurizing seals 86.

Piston 50 is driven through an upstroke and a downstroke along longitudinal axis L-L by a driving mechanism, such as reciprocating drive 20, to draw fluid into and drive fluid downstream from displacement pump 18. During an upstroke, piston 50 is drawn in the downstream direction, indicated by downstream arrow in FIG. 2B, along longitudinal axis L-L. As piston 50 moves in the downstream direction, first fluid chamber 98 expands and second fluid chamber 100 contracts, due to piston head 54 shifting in the downstream direction. The expanding first fluid chamber 98 experiences a vacuum condition that causes first ball 104 to shift from abutting first seat 106 to abut pin 108. With first ball 104 abutting pin 108, a flowpath is opened through first check valve 82, and fluid is drawn into first fluid chamber 98 through inlet port 68 and first check valve 82. During the upstroke, second ball 110 is forced onto second seat 112 and forms a seal with second seat 112 to prevent fluid within second fluid chamber 100 from flowing upstream into first fluid chamber 98. As the volume of second fluid chamber 100 decreases, the fluid within second fluid chamber 100 is driven downstream through outlet port 66 in cylinder 56.

After an upstroke, piston 50 reverses course and is driven through a downstroke. During a downstroke piston 50 is driven in the upstream direction, indicated by upstream arrow in FIG. 2B. During the downstroke, the volume of first fluid chamber 98 contracts and the volume of second fluid chamber 100 expands. As piston 50 changes over from the upstroke to the downstroke second ball 110 shifts from engaging second seat 112 to abutting upstream face 92, providing a flowpath through second check valve 84. With second ball 110 abutting upstream face 92, fluid is able to flow downstream from first fluid chamber 98 and into second fluid chamber 100. As second ball 110 shifts to abut upstream face 92, first ball 104 shifts from abutting pin 108 to engaging first seat 106. First ball 104 engaging first seat 106 closes first check valve 82 such that fluid is prevented from backflowing from first fluid chamber 98 through inlet port 68. Outlet port 66 is in unobstructed fluid communication with second fluid chamber 100, and as will be appreciated, fluid is driven downstream through outlet port 66 during both the upstroke and the downstroke of piston 50.

As piston 50 travels through the downstroke, the fluid within first fluid chamber 98 flows through piston head 54, second check valve 84, and flutes 94 to enter second fluid chamber 100. The fluid flows along flutes 94 disposed on second end 90 of piston rod 52 between upstream face 92 and second fluid chamber 100. Flutes 94 provide the flowpath for fluid to flow into second fluid chamber 100 from piston head 54. Flutes 94 are configured to provide the sole flowpath for fluid to flow from the first fluid chamber 98 into the second fluid chamber 100. In the embodiment illustrated, no alternative pathway to the flutes 84 is provided for the fluid to flow from the first chamber 98 and into the second chamber 100. As such, the fluid flows along flutes 94, and flutes 94 introduce the fluid into second fluid chamber 100. Flutes 94 are configured to introduce the fluid into second fluid chamber 100 along any portion of flutes 94 open to second fluid chamber 100. In this way, flutes 94 are internal fluid passage within piston 50 through which fluid being pumped is forced to flow by reciprocation of piston 50. For example, a downstream portion of flutes 94 extends downstream of a downstream end of piston head 54 and the portion of flutes disperses the fluid into second fluid chamber 100 along a full length of the downstream portion. In this way, flutes 94 extend out of downstream aperture 96 and downstream beyond downstream face 97 such that each flute 94 is partially overlapped by piston head 54 and partially exposed. As shown, flutes 94 terminate downstream of piston head 54 in a ramped surface, thereby facilitating a gentle flow of the fluid into the second fluid chamber. While flutes 94 are illustrated as terminating in a ramped surface, it is understood that flutes can include any desired contour for facilitating the flow of the fluid into the second fluid chamber 100, such as squared, rounded, or any other desired contour.

Piston 50, cylinder 56, intake housing 58, retainer 114, ball cage 102, and pin 108 can be machined or cast from any type of steel, brass, aluminum, or other suitable metal. In particular, piston rod 52 and piston head 54 can be formed from hardened 440C stainless steel. Piston rod 52 can be chromed along those surfaces that interface with packing rings 116a. Piston rod 52 and piston head 54 can be fabricated separately. Flutes 94 can be formed with any suitable manufacturing technique, such as flat or ball-end milling from a side of piston rod 52, or drilling from an end of piston rod 52. Flutes 94 can also be cast-in-place. After flutes 94 are formed, and piston rod 52 and piston head 54 can be joined to form piston 50. Ball cage 102 can also be molded from a polymer. Packing rings 116a and 116b can be formed from leather, polymer, or other suitable sealing materials. First seat 106 and second seat 112 can be formed from a high-strength material, such as tungsten carbide. First ball 104 and second ball 110 can be formed from stainless steel or other suitable materials for forming a seal with first seat 106 and second seat 112, respectively.

Flutes 94 provide significant advantages. Flowing the fluid along flutes 94 facilitates gentle, laminar flow of the fluid into the second fluid chamber 100. Encouraging the gentle, laminar flow of the fluid reduces friction between any grit or other solids contained in the fluids and the various components within displacement pump 18, thereby reducing costs associated with displacement pump 18 and increasing the lifespan of displacement pump 18. In addition, a downstream portion of flutes 94 open to second fluid chamber 100 reduces hydraulic resistance and encourages laminar flow by dispersing the fluid along a length of the downstream portion. Moreover, flutes 94 provide a large cross-sectional flow area for introducing the fluid into second fluid chamber 100. The large cross-sectional flow area of flutes 94 reduces hydraulic resistance and turbulence, thereby providing greater pump efficiency.

Figure 3A:
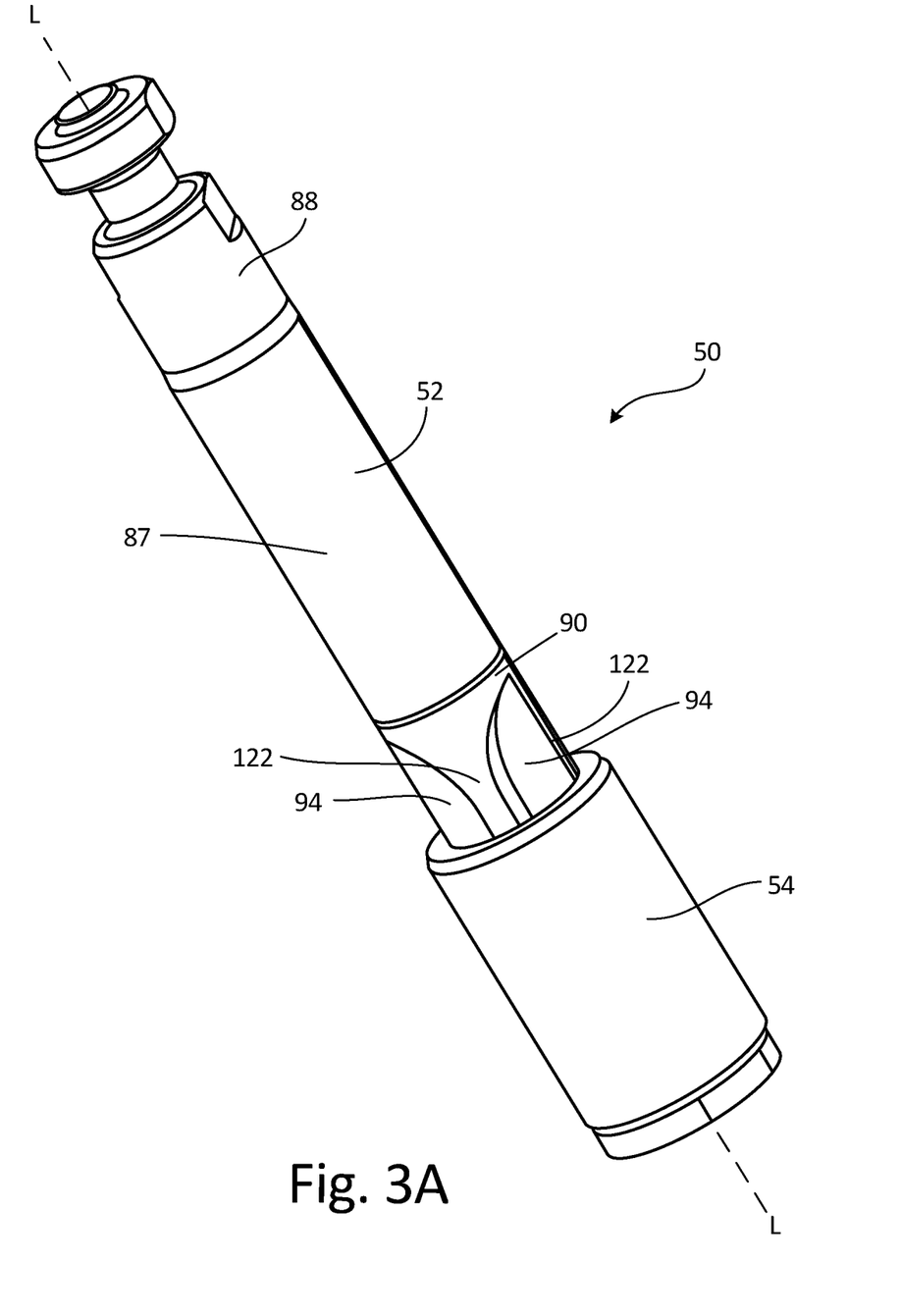
FIG. 3A is an assembled isometric view of a piston rod and piston head.
Figure 3B:
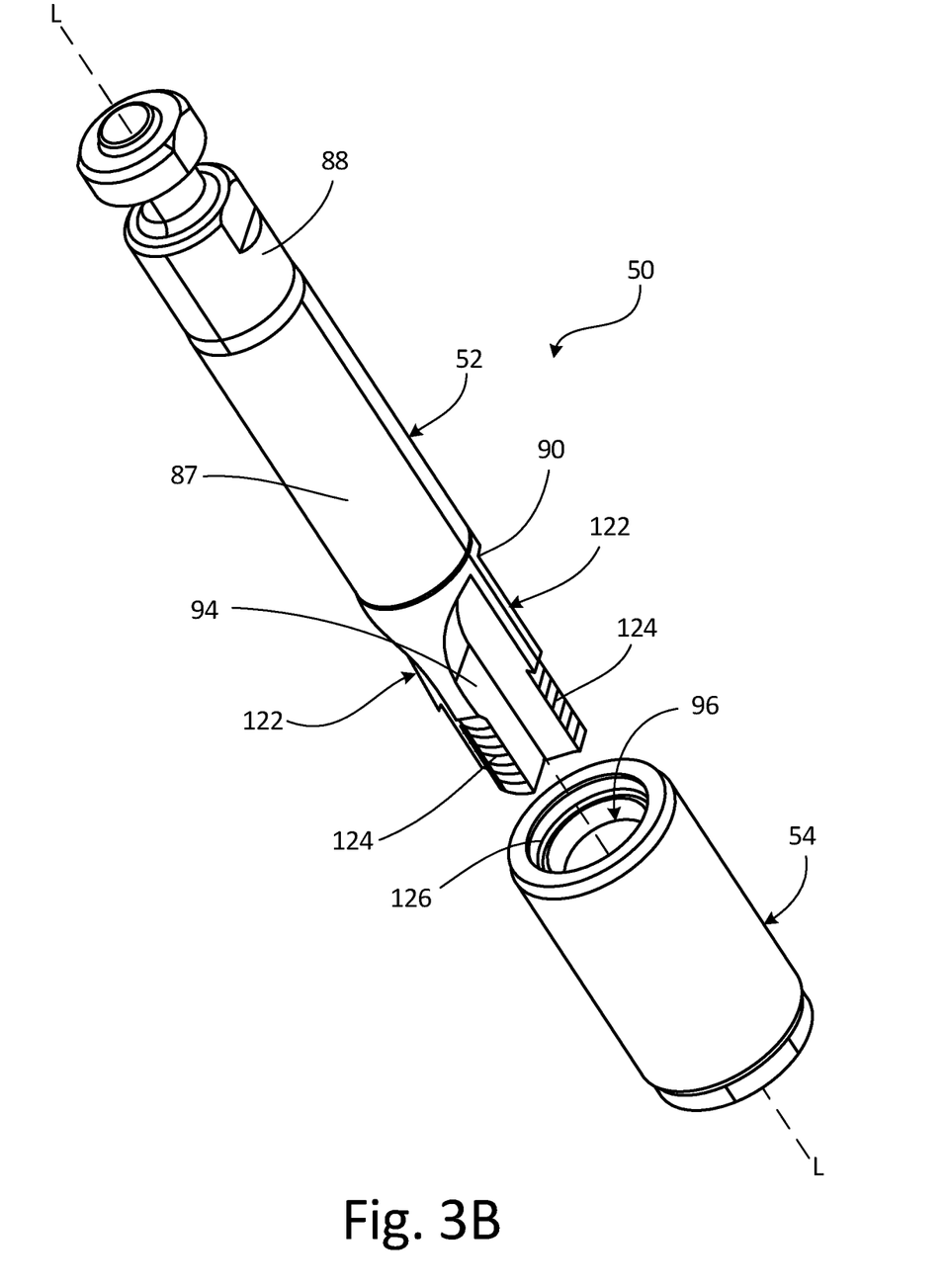
FIG. 3B is an exploded isometric view of the piston rod and piston head of FIG. 3A.

FIG. 3A is an assembled isometric view of piston 50. FIG. 3B is an exploded isometric view of piston 50. FIGS. 3A and 3B will be discussed together. Piston 50 includes piston rod 52 and piston head 54. Piston rod 52 includes piston rod body 87, and piston rod body 87 includes first end 88 and second end 90. Second end 90 includes upstream face 92, flutes 94, and ridges 122. Ridges 122 include rod connecting portion 124. Piston head 54 includes upstream face 95, downstream face 97, and central bore 117, which extends through piston head 54. Piston head further includes downstream aperture 96 and upstream bore 99, which, in the embodiment shown, form a downstream portion and an upstream portion of central bore 117, respectively. Downstream aperture 96 includes piston connecting portion 126.

Piston rod body 87 is elongated along longitudinal axis L-L between first end 88 and second end 90. First end 88 of piston rod 52 is configured to extend out of a pump housing, such as cylinder 56 (best seen in FIGS. 2A and 2B), and engage a driving mechanism, such as reciprocating drive 20 (shown in FIG. 1B). Second end 90 of piston rod 52 extends at least partially into downstream aperture 96, with upstream face 92 disposed within downstream aperture 96. Flutes 94 and ridges 122 extend along second end 90 and terminate outside of downstream aperture 96. While flutes 94 are described as terminating outside of downstream aperture 96, it is understood that flutes 94 can extend any desired distance outside of aperture 94 such that the fluid is introduced downstream through flutes 94. Each flute 94 can thus be partially overlapped by piston head 54 and partially exposed. Flutes 94 can be open grooves extending along an exterior of piston rod body 87. Ridges 122 can represent a constant diameter from body of piston rod 52, such that flutes 94 are formed by removal of material from second end 90 of piston rod 52.

Ridges 122 are disposed between and divide flutes 94, such that flutes 94 can be depressions between ridges 122. Rod connecting portion 124 extends along an upstream portion of ridges 122, but rod connecting portion 124 can extend along any desired length of ridges 122. Piston connecting portion 126 is disposed on an interior surface of downstream aperture 96 and can extend fully about the interior surface of downstream aperture 96. Rod connecting portion 124 can include any suitable feature for interfacing with piston connecting portion 126, to thereby secure piston rod 52 to piston head 54. As shown, rod connecting portion 124 can include exterior threading and piston connecting portion 126 can include interior threading configured to mate with the exterior threading. Where rod connecting portion 124 includes exterior threading, the exterior threading can be limited to ridges 122 such that the exterior threading is interrupted by flutes 94. In addition to being connected with threads, rod connecting portion 124 can also be glued or welded to piston connecting portion 126. Moreover, rod connecting portion 124 can be formed integral with piston connecting portion 126, such that piston 50 is of a single-piece construction.

During operation, piston 50 is driven in a reciprocating manner along longitudinal axis L-L. As discussed above, a fluid flows through piston head 54 and along flutes 94 as the fluid is pumped downstream. Flutes 94 provide the only flowpaths for the fluid to flow downstream through piston 50. Flutes 94 extend along second end 90 of piston rod 52 and terminate in ramped surfaces. While flutes 94 are illustrated as terminating in ramped surfaces, it is understood that flutes 94 can terminate in any desired surface configuration. Each flute 94 preferably has a depth in the range of 20-40 percent of a diameter of piston rod body 87. Flutes 94 are disposed about a circumference of second end 90, and second end 90 can include as many or as few flutes 94 as desired, such as two flutes, three flutes, four flutes, or any desired number of flutes. Flutes 94 can be evenly arrayed about piston rod body 87.

Piston 50 can be machined or cast from metal, such as any type of steel, brass, aluminum, or other suitable metal. In particular, piston rod 52 and piston head 54 can be formed from hardened 440C stainless steel. Piston rod 52 can be chromed along those surfaces that interface with packing rings 116a. Piston rod 52 and piston head 54 can be fabricated separately. Flutes 94 can be formed with any suitable manufacturing technique, such as flat or ball-end milling from a side of piston rod 52, or drilling from an end of piston rod 52. Flutes 94 can also be cast-in-place. After flutes 94 are formed, and piston rod 52 and piston head 54 can be joined to form piston 50.

A two-part piston 50 provides significant advantages. Conventionally, a piston is manufactured from a single piece of metal, through which a first bore is formed through the piston rod, extending from the upstream side coaxial with the longitudinal axis. A second bore, and optionally a third bore, extend into the one-piece piston orthogonal to the longitudinal axis and connect with the first bore. In such an embodiment, the entire one-piece piston must be replaced if any part of the one-piece piston fails. Unlike a conventional one-piece piston, embodiments of piston 50 include piston rod 52 that is separable from piston head 54. Where piston rod 52 is separable from piston head 54 only one of piston rod 52 and piston head 54 need be replaced if that part fails, thereby reducing cost and material requirements.

Flutes 94 provide additional, significant advantages. Unlike the orthogonal second bore and optional third bore, which increase hydraulic resistance and turbulent flow, flutes 94 introduce the fluid downstream of piston head 54 without abruptly turning the fluid or otherwise impeding the flow. Flutes 94 thus encourage laminar flow by gradually turning the flow as the fluid flows downstream, thereby reducing hydraulic resistance and reducing turbulence in the fluid. Flutes 94 also provide a greater cross-sectional flow area than the traditional one-piece piston, where the first bore extends coaxially with the longitudinal axis and the fluid exits the piston through bores disposed orthogonal to the longitudinal axis. Providing a greater cross-sectional area increases efficiency and encourages laminar flow through piston 50. Because first fluid chamber 98 (shown in FIG. 2B) and second fluid chamber 100 (shown in FIG. 2B) have defined maximum volumes, providing a greater cross-sectional flow area for the fluid to flow between first fluid chamber 98 and second fluid chamber 100 reduces hydraulic resistance and turbulence as the fluid flows to second fluid chamber 100, as the same volume of fluid is transmitted through a greater cross-sectional area.

Figure 4:
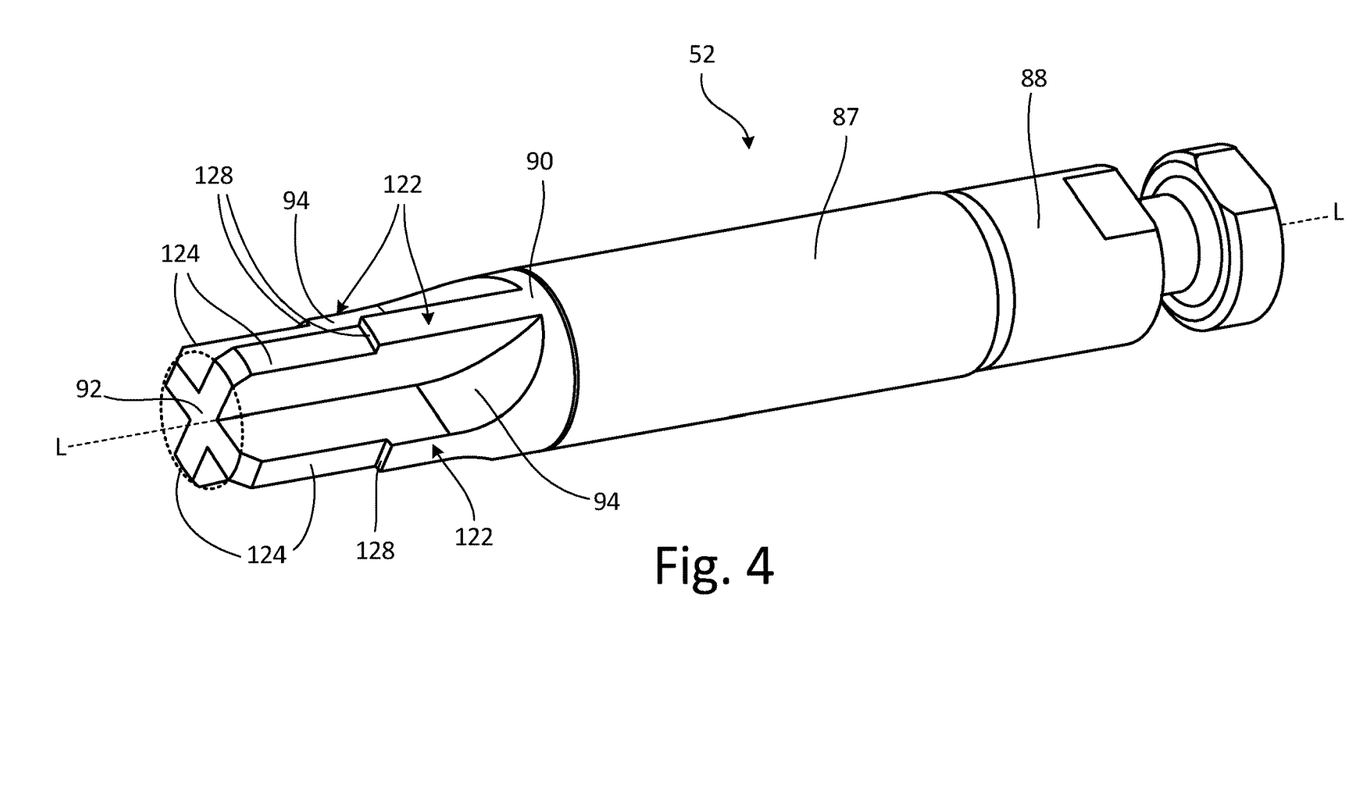
FIG. 4 is an isometric view of a piston rod.

FIG. 4 is an isometric view of piston rod 52. Piston rod 52 includes piston rod body 87, and piston rod body 87 includes first end 88 and second end 90. Second end 90 includes upstream face 92, flutes 94, and ridges 122. Ridges 122 include rod connecting portion 124 and axial stop 128. Flutes 94 extend along second end 90 from upstream face 92 towards first end 88 of piston rod 52, and flutes 94 are open on upstream face 92. Ridges 122 are disposed between flutes 94. Rod connecting portion 124 is disposed on ridges 122, and axial stop 128 is also disposed on ridges 122.

Flutes 94 and ridges 122 extend along second end 90 of piston rod 52 from upstream face 92. Rod connecting portion 124 extends along ridges 122 between upstream face 92 and axial stop 128. In the embodiment shown, four flutes 94 are evenly arrayed about a circumference of piston rod 52, and the four flutes 94 are separated by four ridges 122. It is understood, however, that piston rod 52 can include any desired number of flutes 94, and the desired number of flutes 94 can similarly be evenly arrayed about a circumference of piston rod 52. For example, piston rod 52 can include more or less than four flutes 94, and can include a single flute 94 in an asymmetric configuration. Flutes 94 are formed as depressions between ridges 122, and flutes 94 preferably have a depth between 20-40 percent of a diameter of piston rod body 87. It is understood that flutes 94 can be formed in any desired manner; for example, flutes 94 can be milled from a side of piston rod 52 or can be drilled from an upstream end of piston rod 52.

Rod connecting portion 124 extends along ridges 122 between upstream face 92 and axial stop 128. Rod connecting portion 124 is configured to mate with piston connecting portion 126 (shown in FIG. 3B). Axial stop 128 is configured to abut a downstream edge of piston head 54 (shown in FIGS. 2A-3B) to limit a distance that second end 90 extends into downstream aperture 96 (best seen in FIG. 2B) of piston head 54. In this way, axial stop 128 ensures that upstream face 92 is spaced from second ball 110 (shown in FIG. 2B) such that second ball 110 is able to shift to an open position, where second ball 110 abuts upstream face 92.

Flutes 94 provide flowpaths for a fluid to flow downstream through piston rod 52. In one embodiment, flutes 94 provide the only flowpath for a fluid to flow downstream through piston rod 52, such that the fluid must flow through at least one flute 94. With the second ball 110 abutting upstream face 92, the fluid is free to flow around second ball 110 and into flutes 94. Flutes 94 introduce the fluid into a downstream fluid chamber, such as second fluid chamber 100 (shown in FIG. 2B). The fluid flows along flutes 94, and flutes 94 introduce the fluid into the downstream fluid chamber without abruptly turning the fluid. Instead, flutes 94 can open directly into the downstream fluid chamber such that the fluid disperses into the downstream chamber along a length of flutes 94. Moreover, flutes 94 can terminate in downstream ramped surfaces, as shown, and the ramped surfaces facilitate a gentle, laminar flow of the fluid out of flutes 94 and into the downstream fluid chamber.

Flutes 94 provide significant advantages. Flutes 94 facilitate a gentle, laminar flow of the fluid, thereby preventing turbulence and reducing hydraulic resistance. Moreover, flutes 94 provide an increased cross-sectional flow area as compared to a central bore with cross-holes. The increased cross-sectional flow area provided by flutes 94 provides for greater lifespan and efficiency.

Figure 5A:
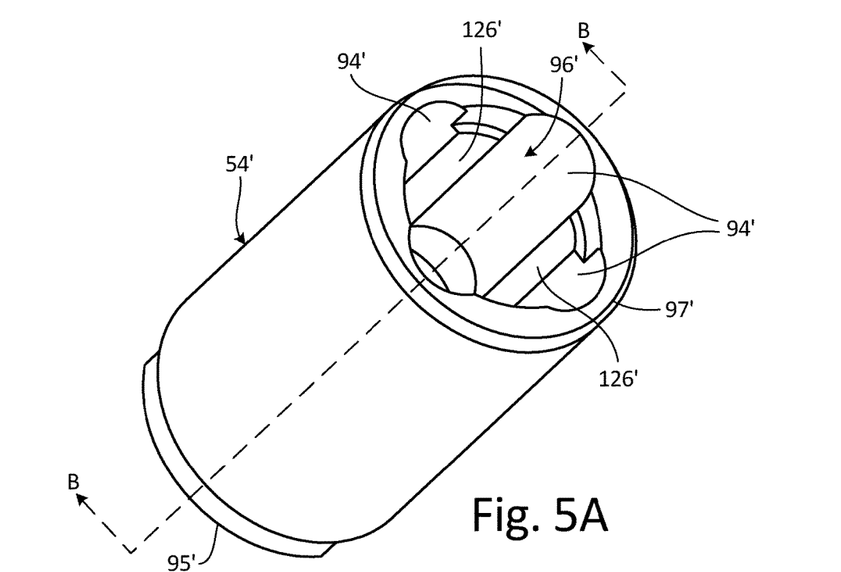
FIG. 5A is an isometric view of a piston head.
Figure 5B:
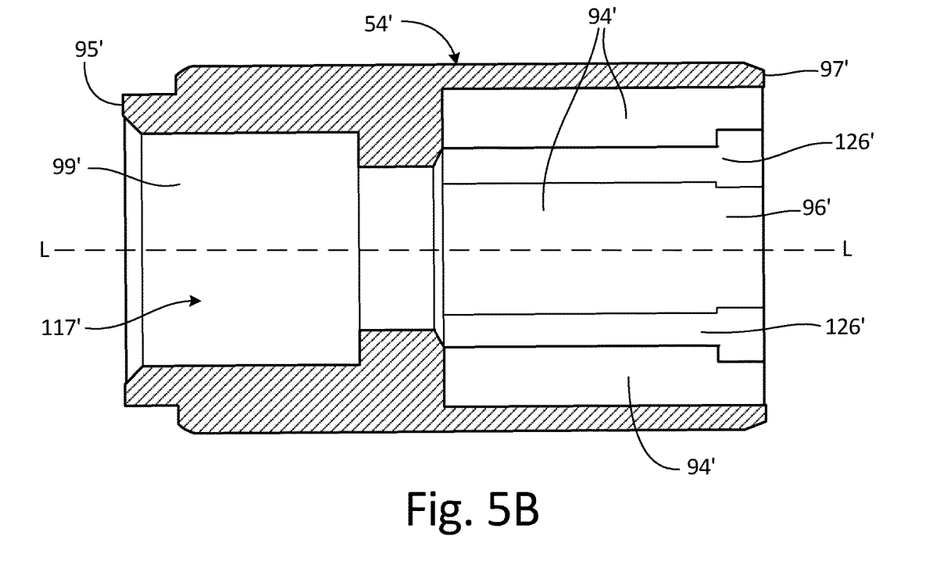
FIG. 5B is a cross-sectional view of the piston head of FIG. 5A.
Figure 5C:
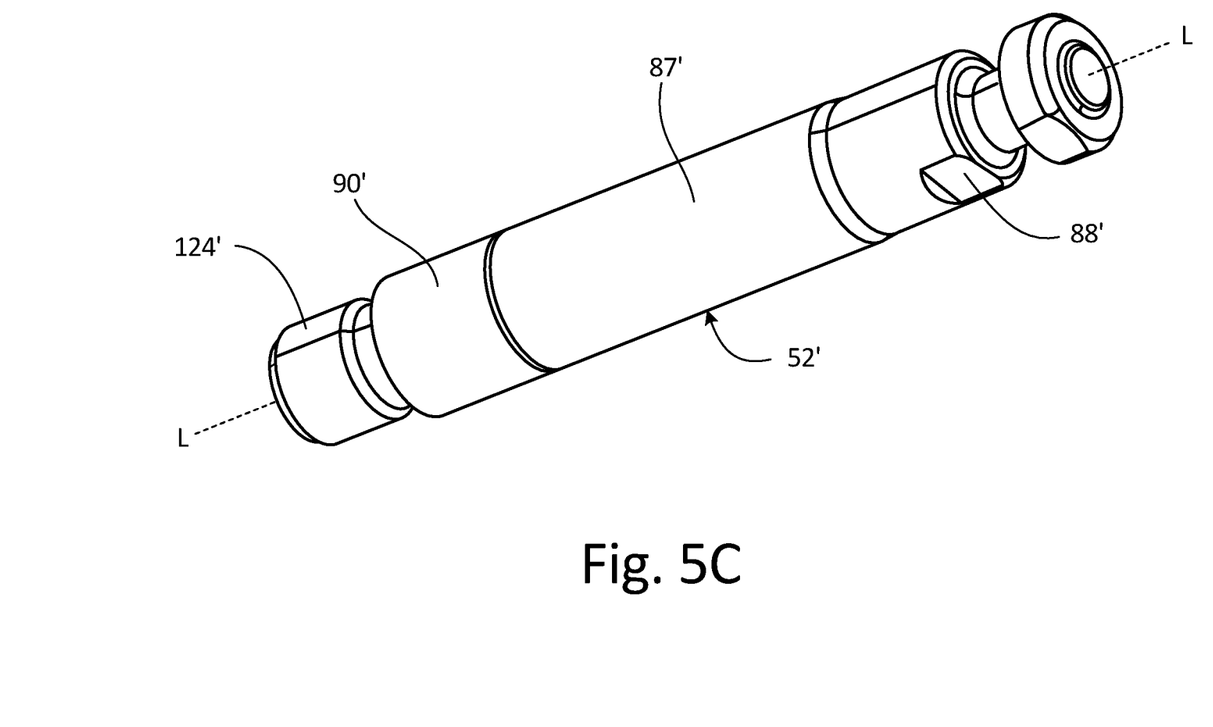
FIG. 5C is a perspective view of a piston rod for the piston head of FIG. 5A.

FIG. 5A is an isometric view of piston head 54'. FIG. 5B is a cross-sectional view of piston head 54' taken along line B-B in FIG. 5A. FIG. 5C is an isometric view of piston rod 52' for use with piston head 54'. FIGS. 5A-5C will be discussed together. Piston head 54' includes upstream face 95', downstream face 97', and central bore 117'. Piston head 54' further include downstream aperture 96' and upstream bore 99', which, in the embodiment shown, form a downstream portion and an upstream portion of central bore 117', respectively. Downstream aperture 96' includes flutes 94' and piston connecting surface 126'. Piston rod 52' includes piston rod body 87', first end 88', and second end 90'. Second end 90' includes rod connecting surface 124'.

Central bore 117' extends through piston head 54' from an upstream end to a downstream end. Downstream aperture 96' extends through and is open on downstream face 97', and upstream bore 99' extends through and is open on upstream face 95'. Flutes 94' extend within downstream aperture 96', and piston connecting surfaces 126' are disposed between flutes 94'. Piston rod body 87' is elongated between first end 88' and second end 90'. First end 88' is similar to first end 88 (shown in FIGS. 1A-4), and first end 88' is configured to connect to a driving mechanism, such as reciprocating drive 20 (shown in FIG. 1B). First end 88' can be connected to the driving mechanism in any desired manner, such as by being inserted into a slot in the driving mechanism or by being pinned to the driving mechanism. Second end 90' of piston rod 52' is at least partially disposed within downstream aperture 96', with rod connecting surface 124' interfacing with piston connecting surface 126' to secure piston rod 52' to piston head 54'. As such, a diameter of piston head 54' is preferably larger than a diameter of piston rod 52'. Rod connecting surface 124' and piston connecting surface 126' can be joined in any desired manner. For example, rod connecting surface 124' can include a first set of threads and piston connecting surface 126' can include a second set of threads configured to mate with the first set of threads. Alternatively, rod connecting surface 124' can be glued or welded to piston connecting surface 126'. Piston rod 52' and piston head 54' can also be integrally formed as a single part, in a single-piece configuration.

Flutes 94' are depressions disposed circumferentially about downstream aperture 96', such that fluid flows between an outer circumference of second end 90' and piston head 54'. Flutes 94' are evenly arrayed about a circumference of downstream aperture 96'. Flutes 94' are similar to flutes 94 (shown in FIGS. 2B-4), in that both flutes 94' and flutes 94 provide flowpaths for a fluid to flow between a piston rod and a piston. Flutes 94' provide flowpaths for the fluid to flow through downstream aperture 96' and around second end 90' of piston rod 52'. Flutes 94' introduce the fluid into a downstream fluid chamber, such as second fluid chamber 100 (shown in FIG. 2B), such that the fluid is flowing substantially parallel to longitudinal axis L-L when the fluid exits flutes 94'. As such, flutes 94' introduce the fluid into a downstream chamber without turning the flow of the fluid. Flutes 94' can provide the only flowpath for the fluid to flow about second end 90' of piston rod 52' such that the fluid must flow through flutes 94' to flow downstream to the downstream chamber. During operation, piston head 54' and piston rod 52' reciprocate along longitudinal axis L-L, similar to piston 50, to drive a fluid downstream through piston head 54'. It is understood that piston head 54' and piston rod 52' can be used with any suitable pump, such as displacement pump 18 (shown in FIGS. 1A-2B).

During operation, the fluid enters piston head 54' through upstream bore 99' and flows to downstream aperture 96'. The fluid encounters an upstream, distal end of second end 90' of piston rod 52' within downstream aperture 96' and flows through flutes 94'. The fluid is thus provided downstream through flutes 94' disposed on an interior surface of piston head 54'. With flutes 94' disposed on the interior surface of piston head 54', piston rod 52' can consist of a single-piece construction, without any bores or other passageways extending through piston rod 52'. In this way, the manufacturing of piston rod 52' is simplified and the cost of piston rod 52' is reduced.

Piston rod 52' and piston head 54' can be machined or cast from metal, such as any type of steel, brass, aluminum, or other suitable metal. In particular, piston rod 52' and piston head 54' can be formed from hardened 440C stainless steel. Piston rod 52' can be chromed along those surfaces that interface with packing rings 116a. Piston rod 52' and piston head 54' can be fabricated separately. Flutes 94 can be formed with any suitable manufacturing technique, such as flat or ball-end milling from a side of piston rod 52', or drilling from an end of piston rod 52'. Flutes 94' can also be cast-in-place. After flutes 94' are formed, and piston rod 52' and piston head 54' can be joined to form a piston.

A two-part piston provides significant advantages. Where piston rod 52' and piston head 54' are separable, such as where piston rod 52' is threaded to piston head 54', only one of piston rod 52' and piston head 54' need be replaced due to the failure of that part. For example, if piston rod 52' were to fail, the failed piston rod 52' could be disconnected from piston head 54' and replaced with a functional piston rod 52'. Replacing only one of piston head 54' and piston rod 52' reduces costs and material waste.

Flutes 94' provide significant advantages. During operation, the fluid flows directly from flutes 94' into a downstream fluid chamber, such as second fluid chamber 100 (shown in FIG. 2B), without being turned by piston head 54' or piston rod 52'. Flowing the fluid directly from flutes 94' and into the downstream fluid chamber encourages laminar flow and thus the efficiency of the pump within which piston head 54' and piston rod 52' are utilized. Piston head 54' and piston rod 52' are utilized to pump various fluids, such as paint, that contain solids that cause erosion within the pump, particularly when the flow through the pump is turbulent. As such, encouraging laminar flow increases the lifespan of both piston head 54' and piston rod 52', as well as other components within the pump. Moreover, flutes 94' provide a greater cross-sectional area than conventional piston assemblies. Flutes 94' thus provide improved lifespan, performance, and efficiency.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A piston for pumping fluid, the piston comprising:
   a piston rod having a piston rod body having an upstream end and a downstream end and elongated along a longitudinal axis;
   a piston head attached to the piston rod and having a downstream aperture the upstream end of the piston rod extending into the downstream aperture of the piston head; and
   one or more flutes at least partially disposed between the piston rod and the piston head such that each of the one or more flutes is at least partially covered b the piston head;
   wherein each of the one or more flutes respectively comprises an open groove that extends along one of an exterior of the piston rod body and an interior of the piston head; and
   wherein fluid flows between the piston rod and the piston head within the one or more flutes during pumping.

2. The piston of claim 1, wherein the one or more flutes comprises at least two flutes arrayed around the piston rod body.

3. The piston of claim 1, wherein the one or more flutes comprises at least three flutes which are evenly arrayed around the piston rod body.

4. The piston claim 1, wherein the piston rod body comprises:
   at least two ridges located along the upstream end;
   wherein the one or more flutes comprises at least two flutes located along the upstream end, and the at least two flutes are defined by a corresponding number of the at least two ridges.

5. The piston of claim 4, wherein threading is formed on the at least two ridges.

6. The piston of claim 1, wherein the piston rod body further comprises an upstream face, and the one or more flutes are open on the upstream face.

7. The piston of claim 1, wherein each flute of the one or more flutes has a depth in the range of 20-40 percent of the diameter of the piston rod body.

8. The piston of claim 1, wherein the upstream end of the piston rod is attached to the piston head by interfaced threading on the piston rod and the piston head.

9. The piston of claim 1, wherein the piston head comprises a central bore in fluid communication with the one or more flutes, wherein the fluid flows through the central bore and then within the one or more flutes during pumping.

10. The piston of claim 1, and further comprising a check valve comprising a ball disposed within the piston head, wherein the piston rod serves as a downstream stop for the ball of the check valve.

11. The piston of claim 1, wherein the piston head is larger in diameter than the piston rod.

12. The piston of claim 1, wherein each of the one or more flutes is formed on the exterior of the piston rod body, and wherein each of the one or more flutes extends into the downstream aperture and further extends downstream beyond the piston head such that each flute is partially covered by the piston head and partially exposed.

13. A pump, the pump comprising:
   the piston of claim 1; and
   a cylinder within which the piston is at least partially disposed, wherein the piston reciprocates within the cylinder to pump the fluid.

14. The pump of claim 13, and wherein:
   the cylinder comprises a cylinder chamber;
   the piston head divides the cylinder chamber into an upstream chamber and a downstream chamber;
   the fluid being pumped flows from the upstream chamber to the downstream chamber by traveling from the upstream chamber into and through the piston head, flowing within the one or more flutes, and being expelled from the one or more flutes into the downstream chamber; and
   the one or more flutes provide the only flowpath between the upstream chamber and the downstream chamber such that the fluid being pumped must flow through the one or more flutes when flowing to the downstream chamber from the upstream chamber.

15. The piston of claim 1, wherein each of the one or more flutes is formed on the interior of the piston head.

16. The piston of claim 15, wherein:
   the one or more flutes comprise at least two flutes formed on the interior of the piston head in the downstream aperture;
   the piston head is larger in diameter than the piston rod and includes at least two connecting surfaces formed on the interior of the piston head and disposed between the at least two flutes; and
   the at least two connecting surfaces are configured to attach to the upstream end of the piston rod to secure the piston rod to the piston head, such that each of the at least two flutes are at least partially defined by at least one of the piston connecting surfaces and the upstream end of the piston rod.

17. An airless paint spraying system comprising:
   a pump configured to pump paint for spraying, wherein the pump includes the piston of claim 1.

18. A piston for pumping fluid by reciprocating along a longitudinal axis, the piston comprising:
   a piston rod elongated to have a downstream end and an upstream end;
   a piston head having a head upstream face, an upstream bore open on the head upstream face, and a downstream aperture in fluid communication with the upstream bore, wherein the upstream end of the piston rod extends into the downstream aperture of the piston head, the piston head is larger in diameter than the piston rod, and the piston rod and the piston head are coaxial with. the longitudinal axis; and
   at least two flutes in fluid communication with the upstream bore and along which the fluid being pumped flows, the at least two flutes formed one of along the downstream aperture of the piston head and along the upstream end of the piston rod;

wherein each of the at least two flutes is at least partially disposed between the piston rod and the piston head such that the at least two flutes are at least partially covered by the piston head and are at least partially defined by the upstream end of the piston rod head; and wherein fluid flows between the piston rod and the piston head within the at least two flutes during pumping.

19. The piston of claim 18, wherein the at least two flutes are evenly arrayed about the longitudinal axis.

20. The piston of claim 19, wherein:

the piston comprises a check valve;

the piston rod comprises a rod upstream face;

the at least two flutes are formed as grooves along the upstream end of the piston rod and are open on the upstream face of the piston rod; and each of the at least two flutes extends into the downstream aperture and further extends downstream beyond the piston head such that each flute is partially overlapped by the piston head and partially exposed.

21. A pump for pumping fluid, the pump comprising:

a piston comprising:

a piston rod elongated to have a downstream end and an upstream end, the piston rod comprising two or more flutes extending along, and arrayed around, an exterior of the downstream end of the piston rod, each of the flutes comprising a groove formed into the exterior of the downstream end; and a piston head having an downstream aperture, wherein the upstream end of the piston rod extends into the downstream aperture of the piston head; and a cylinder within which the piston is at least partially disposed, wherein the piston is configured to reciprocate within the cylinder to pump fluid wherein the piston head divides the cylinder into an upstream chamber and a downstream chamber;

wherein the fluid being pumped flows from the upstream chamber to the downstream chamber by traveling from the upstream chamber into and through the piston head, flowing within at least one of the two or more flutes, and being expelled from the two or more flutes into the downstream chamber; and wherein the one or more flutes provide the only flowpath between the upstream chamber and the downstream chamber such that all fluid being pumped must flow through at least one of the two or more flutes when flowing to the downstream chamber from the upstream chamber.

22. A piston rod for pumping fluid, the piston rod comprising:

a piston rod body elongated along a longitudinal axis, the piston rod body comprising:

a downstream end;

an upstream end disposed opposite the downstream end; and at least two flutes, each of the at least two flutes defined by a corresponding number of ridges and each of at least two flutes respectively comprising an open groove that extends along an exterior of the upstream end of the piston rod body;

wherein the ridges include a threaded portion comprising a screw thread configured to rotatably connect with internal threading on a pump head, wherein the screw thread is interrupted by the at least two flutes; and wherein fluid flows within the at least two flutes during pumping.

23. The piston rod of claim 22, wherein each ridge includes an axial stop projecting from the ridge over the threaded portion, and wherein the threaded portion extends along each ridge between the upstream end and the axial stop.

* * * * *

UNITED STATES PATENT AND TRADEMARK OFFICE
CERTIFICATE OF CORRECTION

PATENT NO. : 10,428,942 B2
APPLICATION NO. : 15/395139
DATED : October 1, 2019
INVENTOR(S) : Jeromy D. Horning and Christopher A. Lins Page 1 of 1

It is certified that error appears in the above-identified patent and that said Letters Patent is hereby corrected as shown below:

In the Claims

Column 13, Line 34 Claim 1:
Delete "b"
Insert --by--

Column 15, Line 8 Claim 18:
Delete "upstream end of the piston rod head"
Insert --upstream end of the piston rod and the piston head--

Signed and Sealed this
Fourth Day of February, 2020

Andrei Iancu
*Director of the United States Patent and Trademark Office*